United States Patent [19]
Spilo et al.

[11] Patent Number: 6,064,811
[45] Date of Patent: May 16, 2000

[54] COMPUTER MEMORY CONSERVATION SYSTEM

[75] Inventors: Michael L Spilo; Jonathan A. Daub, both of New York, N.Y.

[73] Assignee: Network Associates, Inc., Santa Clara, Calif.

[21] Appl. No.: 08/664,507

[22] Filed: Jun. 17, 1996

[51] Int. Cl.$^7$ .............................. G06F 9/00; G06F 12/00
[52] U.S. Cl. ............................................ 395/674; 711/170
[58] Field of Search ...................................... 395/670, 674, 395/200.56, 651; 711/163, 170, 173

[56] References Cited

U.S. PATENT DOCUMENTS

| | | | |
|---|---|---|---|
| 5,592,652 | 1/1997 | Hongo et al. | 711/170 |
| 5,689,707 | 11/1997 | Donnelly | 711/170 |
| 5,729,710 | 3/1998 | Magee et al. | 395/674 |
| 5,793,979 | 8/1998 | Lichtman et al. | 395/200.56 |

OTHER PUBLICATIONS

John McSorley, "1MBFort Protects Low Memory," *PC Magazine*, Mar. 28, 1995, pp. 283–294.
Matt Pietrek, "Q&A Windows," *Microsoft Systems Journal*, May 1995, pp. 79–90.
Matt Pietrek, *Windows Internals*, 1993, pp. 108–110.
Hummel, Robert L., The Magic Behind Virtual Memory, PC–Computing, v7, n6,pp. 276–279, Jun. 1994.

*Primary Examiner*—Mark H. Rinehart

[57] ABSTRACT

A method for improving the availability of global DOS memory under Microsoft Windows has two primary aspects. First, upper memory blocks are linked to the global heap to increase the amount of global DOS memory available. Second, a reserved area of global DOS memory is maintained to prevent generic memory requests from being fulfilled therefrom. Valid requests for global DOS memory are intercepted to ensure that they are able to be allocated out of global DOS memory or the reserved area. Taken in conjunction, the two aspects of the invention substantially decrease the probability that unavailability of global DOS memory will result in application or system failure.

33 Claims, 2 Drawing Sheets

COMPUTER MEMORY CONSERVATION SYSTEM

This invention relates to a method for preserving a scarce memory resource and more particularly to a method for protecting DOS memory, below the 1 megabyte level, from being allocated by Microsoft Windows programs that do not need it.

BACKGROUND OF THE INVENTION

Before version 3 of the Microsoft Windows operating environment was released, the primary operating system used by so-called "PC-compatible" personal computers is the Microsoft Disk Operating System, commonly known as "MS-DOS" or "DOS." MS-DOS has been in existence, in various forms, since approximately 1981. MS-DOS was originally designed to run on computers having the Intel 8088 microprocessor, present in the original IBM PC.

The 8088 microprocessor is able to access one megabyte of memory. However, because the 8088 is a 16-bit microprocessor, it is only able to directly address 64K at a time using one 16-bit register. In consequence, the full megabyte of memory is divided into sixteen 64K segments. A program running on an 8088 can use the value of another 16-bit register to select the segment on which to operate. This is accomplished by forming a 20-bit address from two 16-bit words, represented as segment:offset, according to a scheme that is well known in the art.

These attributes of the 8088 had a direct effect on the design of the original IBM PC. Of the 1 Mb of addressable memory, the first 640K were allocated to random access memory (RAM). The remaining 384K were reserved for use by hardware adapter interfaces, video card frame buffers, and read-only memory (ROM). At the time, 640K was considered to be far more memory than anyone would need.

Microprocessor design has progressed significantly since then, but MS-DOS has not. The architecture of modern personal computers, including the design of MS-DOS, has been driven largely by the desire to retain a certain degree of software and hardware compatibility with earlier models, even the original IBM PC. Accordingly, a typical PC-compatible computer still has 640K of RAM, followed by an area (e.g., 384K) for hardware adapters, video frame buffers, and ROM. The desire for more memory has been accommodated by adding extended or expanded memory after the one megabyte boundary imposed by the 8088 microprocessor. Without these extensions and alternative memory models and addressing schemes, MS-DOS can not use the memory beyond one megabyte to execute programs.

To retain compatibility with earlier computers, later Intel microprocessors, such as the 80286, 80386, 80486, and Pentium, feature a mode known as "real mode," in which the 8088 microprocessor is emulated to allow MS-DOS programs to run. Many MS-DOS programs, TSRs and device drivers, still run or expect to run in real mode. However, these newer microprocessors also offer "protected mode," which allows for a word size of 32 bits and an address space of up to 4 megabytes (or 4,096 megabytes). Programs written in protected mode can treat the entire available address space as a single segment; the entire space is directly addressable, if desired. Protected mode is so called because it also provides three levels of security or "rings" in which programs can be run, with ring 0 the most privileged and ring 3 the least. This technology can be used to help prevent different programs residing in memory from interfering with each other.

Microsoft Windows version 3 runs on PC-compatible computers in conjunction with MS-DOS. MS-DOS (or some other compatible disk operating system) is required to run Windows. Although Windows version 3 and later versions provide the ability to execute Windows programs in protected mode on 80386 and later microprocessors, Windows still relies on real mode MS-DOS for a variety of reasons.

There are many existing items of software designed for the real mode DOS environment that can be useful to a Windows program, including MS-DOS itself. In order to communicate with such real mode software, Windows is typically required to pass data in a form addressable by the real mode software. Similarly, the real mode software must make its data available to Windows at a location real mode software can reach. Consequently, such data can only be passed between Windows and a real mode program through memory space in the first megabyte.

Furthermore, certain hardware devices require memory to be reserved in the first megabyte, typically for communication with real mode device drivers. There may be Windows programs or drivers provided to take control of the device for the duration of the Windows session in order to provide device services to Windows programs. Accordingly, space in the first megabyte may be required for this purpose.

Moreover, due to the fact that Windows runs over MS-DOS, in order to communicate with the real mode DOS layer, certain Windows system components must reserve for shared use portions of memory space in the first megabyte. For example, when a DOS program is executed, it is assigned an area of memory termed the Program Segment Prefix (PSP) in which MS-DOS maintains certain information, including the open files maintained by the program. Real mode MS-DOS implicitly allocates the PSP in the first megabyte of memory. For Windows to interact correctly with MS-DOS, it too must create a PSP in the first megabyte for any program it runs.

When Windows is not running, all memory below 640K and certain memory between 640K and 1M is under the management of DOS. Some memory between 640K and 1M is in the form of Upper Memory Blocks ("UMBs") created by an Expanded Memory Manager such as EMM386 which is provided with both MS-DOS and Windows. UMBs are regions of RAM, possibly mapped in from physical addresses above 1M, located in regions between reserved areas above 640K (such as the video frame buffers and ROM areas previously discussed). Once RAM is mapped in, UMBs can contain real mode programs and device drivers, and also can be a potentially significant source of free space below the 1M boundary.

When Windows is executed, ownership of all DOS memory below 1M is transferred to the Windows Virtual Machine Manager (VMM), a low-level service of Microsoft Windows. This memory is made available to be allocated by virtual device drivers through the __Allocate__Global__ V86__Data__Area service of the VMM. Typically, a small amount of the memory below 640K is used by various system and third-party virtual device drivers. However, since UMB memory must be specifically requested by virtual device drivers, and because it is not available on all computers, it is seldom used. Such unused memory remains unused while Windows runs.

The remainder of the memory below 640K that has not been allocated by a virtual device is provided to the Windows KERNEL to become part of the global heap. The global heap also contains memory from above the 1M boundary. The global heap does not, however, include UMB memory. The portion of the global heap below 1M is known as global DOS memory.

Although special provisions are made by the Windows KERNEL to allow global DOS memory to be specifically requested, it is also treated as an ordinary part of the global heap, subject to allocation by Windows programs and drivers that do not require it. The global heap is a pool of linear address space consisting of global DOS memory below 640K obtained from DOS and memory above 1M obtained from the VMM. Memory can be allocated from the global heap by calling two KERNEL functions: the GlobalAlloc function, which attempts to allocate global heap memory based on several criteria as discussed below; and the GlobalDosAlloc function which attempts to allocate memory from the global DOS portion of the heap.

In attempting to allocate a block of memory from the global heap by calling GlobalAlloc, the calling program must indicate the type of memory requested: fixed, movable, or discardable. A fixed memory block is locked at its allocated linear address within the global heap; it is guaranteed not to move. A movable block can be shifted by the KERNEL in order to satisfy other allocation requests or to reduce heap fragmentation; its position is tracked by the KERNEL. A discardable block is movable, but can also be discarded by the KERNEL in order to increase free space or decrease the size of the global heap. All objects allocated by GlobalAlloc come out of a location within the global heap determined by the Windows KERNEL; there is no mechanism by which an application can request that memory come from a specific part of the heap.

However, by design, the KERNEL tends to allocate discardable and movable blocks from the top part of the global heap and fixed blocks from the bottom part. A "first fit" strategy is used: the KERNEL starts at the top or bottom of the global heap, depending on the allocation type, and moves down or up, respectively, until a free region is found that would accommodate the allocation request; that location is used. Consequently, fixed and movable blocks are generally segregated, alleviating somewhat the problem of heap fragmentation.

Because the bottom part of the global heap consists of global DOS memory, it is likely that any GlobalAlloc request for fixed memory will result in the allocation of fixed global DOS memory. The KERNEL will attempt to locate a fixed object as low as possible, so any movable objects in the way will be relocated to higher memory. As discussed above, once a fixed object is allocated in global DOS memory, there it will remain. This is a potentially undesirable result if the fixed object does not need to be in global DOS memory.

Furthermore, certain KERNEL functions for "locking" movable memory blocks, namely GlobalFix, GlobalWire, and GlobalPageLock, all cause the memory sought to be locked to be relocated to the lowest possible position in the global heap and fixed there until unlocked. As discussed above, this can result in unnecessary use of global DOS memory. Furthermore, other locking functions, such as GlobalLock and LockSegment, will cause a block to be fixed wherever it is within the global heap; if it is already in global DOS memory, it will be fixed there.

Moreover, programs or driver segments loaded by Windows can include a "fixed" attribute, specifying that the segments should be allocated as fixed memory. As discussed above, fixed memory is located low in the global heap, potentially in the global DOS region. The Windows system components that load early in the boot process also tend to be loaded into global DOS memory (because of the first-fit strategy and because the VMM has not yet brought the area beyond 1M into the global heap); these components may then lock themselves wherever they are loaded.

As seen above, numerous factors contribute to the overuse of global DOS memory. However, as cited above, a Windows program or Windows itself is often required to acquire global DOS memory for a valid use. The foregoing factors can lead to a shortage of global DOS memory, causing program failure or the inability to execute programs despite otherwise abundant memory resources.

The 1MBFort program described in the Mar. 28, 1995 issue of PC Magazine represents one attempt to resolve these problems. As discussed, one valid Windows use for global DOS memory is to store the PSPs for executing programs. The solution provided by 1MBFort intentionally fragments the global DOS portion of the global heap into 10K pieces, thereby forcing out movable memory blocks. Because PSP blocks are only 512 bytes long, they are always likely to find room within such a fragmented memory space. However, larger objects are not.

This approach has several drawbacks. Fragmenting the global DOS portion of the heap prevents valid requests for global DOS memory blocks larger than 10K from succeeding. Furthermore, because 1MBFort is an application loaded after the Windows boot process is complete, it cannot affect blocks that are locked into global DOS memory during the boot process. Finally, excessive fragmentation of the global DOS memory space effectively reduces the amount of memory available for bona fide uses.

The Fix1MB program described in the May 1995 issue of Microsoft Systems Journal represents another attempt to minimize the recognized problems. The Fix1MB program recognizes that application programs generally do not allocate or frequently use fixed memory blocks. In order to obtain fixed memory, an application program must explicitly fix the memory using GlobalFix or another of the locking functions previously discussed. The Fix1MB program assumes that the majority of fixed memory allocations occur when an application program or library having the "fixed" attribute, discussed above, is loaded. The Fix1MB program intercepts the LoadModule function, allocates all of the global DOS memory area to itself (less the amount required for the PSP), and holds the global DOS memory until the program or library is loaded. Accordingly, any fixed code segments in the program or library are prevented from consuming global DOS memory, while the PSP can still be allocated as required.

The Fix1MB program has several drawbacks. During the processing of the LoadModule function, the loaded program or library executes its initialization code. If that initialization code contains a valid request for global DOS memory, then the initialization will fail or, if the request can be satisfied out of the area reserved by Fix1MB for the PSP, then a later request to allocate the PSP will fail. Alternatively, if the initialization code launches a second program, then the second request for a PSP might fail. If the loaded module contains a fixed segment the same size or smaller than a PSP, then that segment can be fixed in global DOS memory to the exclusion of the PSP. Finally, the program can, after it is loaded, freely allocate and fix blocks in global DOS memory.

As seen above, prior attempts to resolve problems in over-allocation of global DOS memory have significant drawbacks.

SUMMARY OF THE INVENTION

The invention provides solutions for the problems associated with inefficient memory allocation under Windows.

At an early point in the Windows boot process, an adjustable region of global DOS memory is reserved by the invention and marked as used and fixed.

If a bona fide request for global DOS memory is made that cannot be accommodated by the remaining portion of global DOS memory, the invention will free a portion of the reserved region to allow the request to succeed. Subsequently, the invention will monitor the system to determine if any global DOS memory has been freed. If so, it will reclaim the memory as part of the reserved region.

Furthermore, as discussed above, it is recognized that memory in UMBs is often unutilized by Windows. Accordingly, such memory is identified by the invention and linked into the global DOS portion of the global heap to provide additional global DOS memory.

As seen above, by increasing the amount of global DOS memory available and by ensuring that generic global memory requests do not needlessly result in the allocation of global DOS memory, the invention substantially diminishes the problem of global DOS memory shortages under Microsoft Windows.

DESCRIPTION OF THE PREFERRED EMBODIMENT

A detailed illustrative embodiment of the invention is disclosed. However, a method for improving the availability of a limited memory resource in accordance with the invention may be embodied in a wide variety of forms, some of which may be different from those of the disclosed embodiment. Consequently, the specific functional details disclosed here are representative, and provide a preferred embodiment which does not limit the scope of the invention.

DETAILED DESCRIPTION OF THE INVENTION

Figure 1:
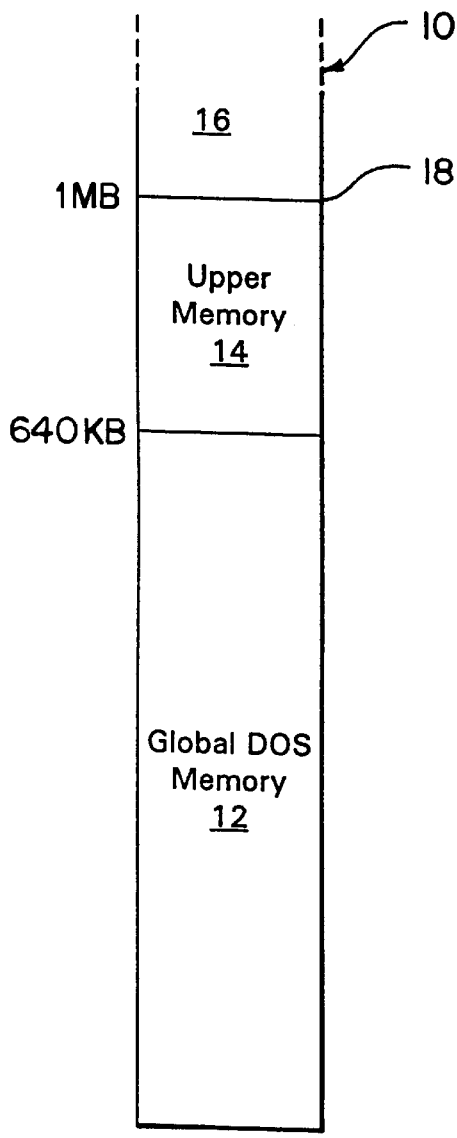
FIG. 1 is a diagram illustrating the layout of memory for a typical PC-compatible computer capable of running MS-DOS and Microsoft Windows.

By way of background, FIG. 1 illustrates a typical memory configuration 10 for a modern PC-compatible computer. Three general regions are shown. A first memory region 12 from 0 to 640K is managed by DOS and is generally free for use in the Windows global heap. A second memory region 14 from 640K to 1M is made up of various sub-areas for the video adapter, UMBs, and ROM (the locations of these sub-areas vary from system to system). A third memory region 16 above 1M is identified by the VMM and used by Windows as part of the global heap.

Figure 2:
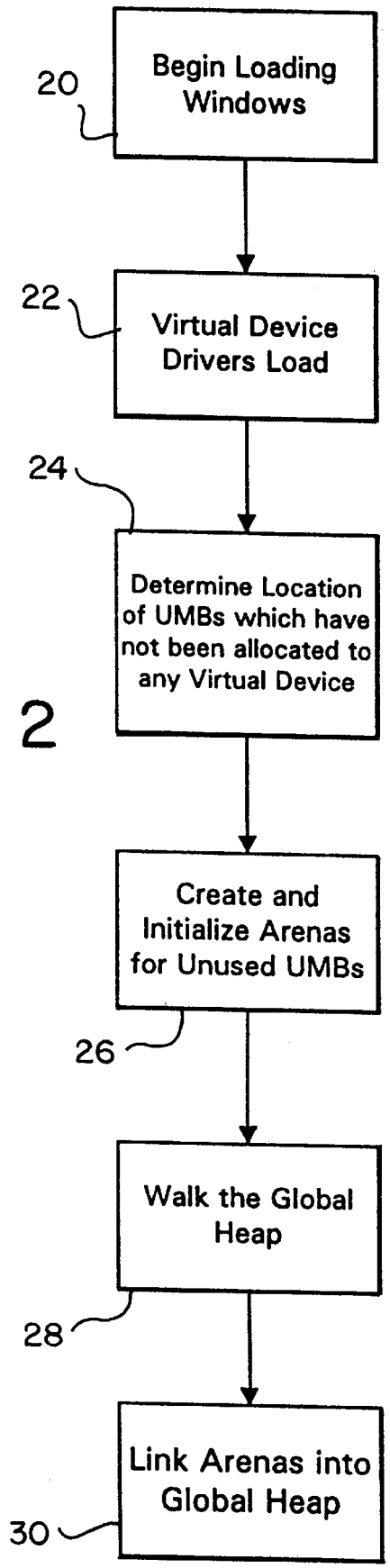
FIG. 2 is a flowchart illustrating the operation of a first aspect of an embodiment of the invention, by which upper memory blocks are identified and added to global DOS memory.

Referring to the flowchart of FIG. 2, initially, Microsoft Windows is allowed to begin its self-loading, or "boot" process. This is shown in FIG. 2 as a step 20. At an early point in the Windows boot process, the invention is invoked to identify as much UMB memory as possible above 640 KB and below the 1M boundary 18. To accomplish this, the invention utilizes the _Allocate_Global_V86_Data_ Area service provided by the VMM to identify all unused UMB memory space. In one embodiment, other virtual device drivers loaded in the Windows boot process are allowed to execute and claim V86 data area (step 22) before the invention claims it from the VMM (step 24). In this embodiment, the allocation is performed by a virtual device driver loaded after all others or elsewhere after all virtual device driver loading is complete (when notified by the Init_Complete system broadcast). Alternatively, the invention can first allocate all of the UMB memory at any time; thereafter the _Allocate_Global_V86_Data_Area call must then be intercepted to permit some of the memory to be relinquished to requesting virtual device drivers.

The allocated UMB memory is linked to the global heap as part of global DOS memory. The global heap control structures are accessed, and global heap arenas are initialized (step 26) to describe the UMB blocks. As described in *Windows Internals* by Matt Pietrek, pp. 108–110, each block of memory in the global heap is tagged with a block arena containing information on the memory; free arenas are maintained by the KERNEL. The new arenas corresponding to the UMB blocks are then added to the arenas maintained by the KERNEL by "walking the heap" (i.e. traversing the linked list of arenas), thereby identifying the location between 640K and 1M in linear address space (step 28), and patching the new arenas into the linked list at that location (step 30).

By following these steps, the invention makes available a larger global DOS memory area than is otherwise available.

The invention also protects against the over-allocation of global DOS memory. An adjustable quantity of global DOS memory is allocated and marked as fixed by the invention. This reserved memory will then be available to service any valid requests for global DOS memory, but will not be used for generic memory requests.

Figure 3:
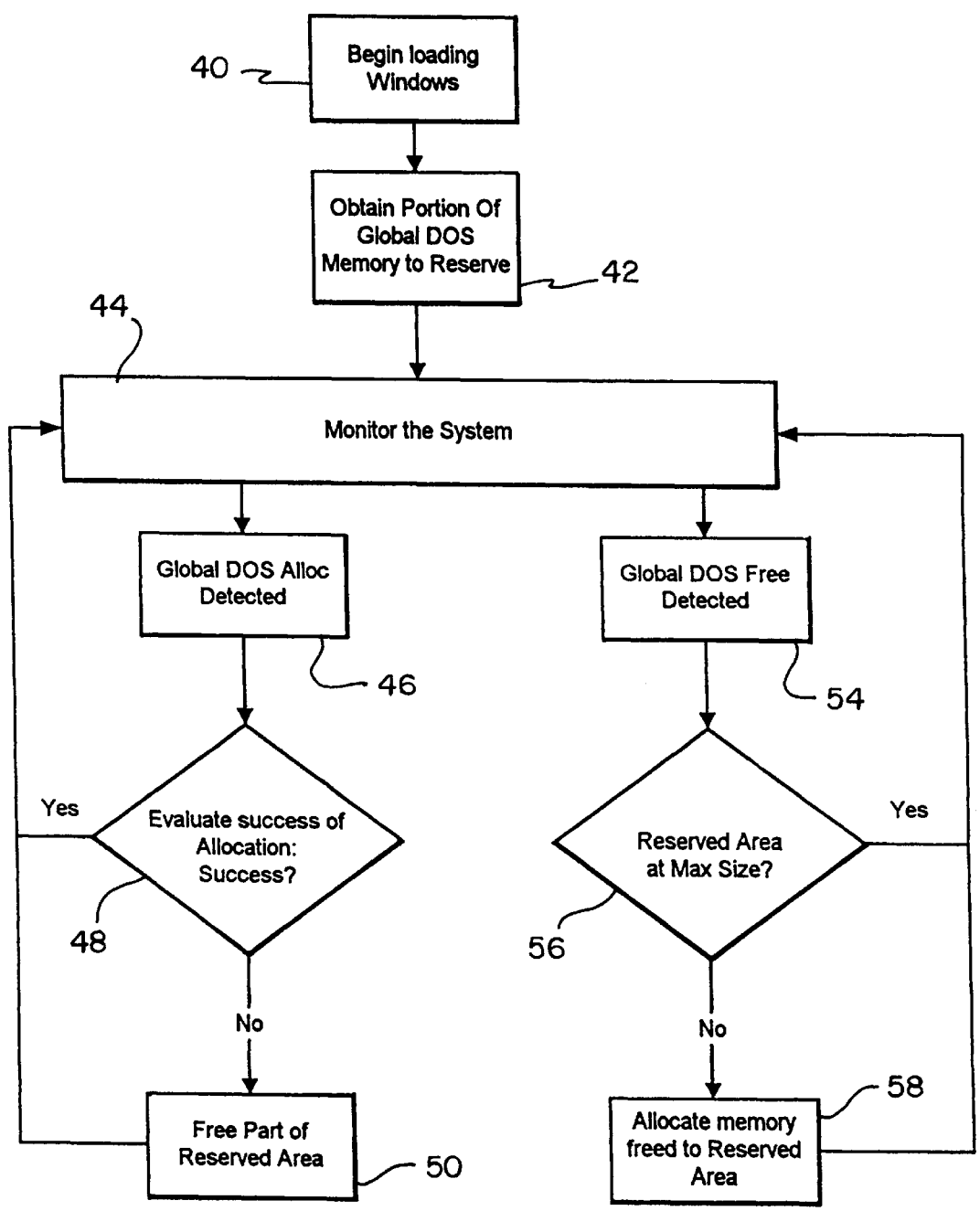
FIG. 3 is a flowchart illustrating the operation of a second aspect of an embodiment of the invention, by which unnecessary allocations of global DOS memory are prevented.

Referring now to the flowchart of FIG. 3, another aspect of the invention begins after Windows begins to load (step 40). To ensure that sufficient global DOS memory is available for the reserved memory, the invention must be invoked early in the Windows boot process, preferably after the KERNEL module but before any other system or third-party components (e.g. GDI or USER). At that time, the only global DOS resources that will have been consumed are those explicitly requested by viral device drivers, as discussed above, and those occupied by KERNEL program segments.

The invention then attempts to acquire a reserved memory area out of the global DOS memory area (step 42). The reserved memory allocated by the invention is obtained by the GlobalDosAlloc function. The quantity can be adjustable based on specific user requirements, but can in practice be as little as 1K. Optionally, the invention can allocate all of global DOS memory during the Windows boot process, releasing all but the reserved portion when system initialization is complete. This technique will minimize global DOS consumption by system or third-party components loaded during the boot process. As stated above, such components frequently contain fixed code segments that may be locked unnecessarily in global DOS memory.

The invention thereafter attempts to maintain the reserved memory at the level specified by the user. The invention monitors valid requests for global DOS memory by intercepting calls to the GlobalDosAlloc and GlobalDosFree functions (step 44). If a GlobalDosAlloc call is detected (step 46), the invention must first determine if the allocation attempt is successful (step 48). If the request made by the GlobalDosAlloc function can be accommodated by using global DOS memory other than the reserved memory, then the invention need take no further action and system performance will be unimpaired.

However, if the allocation attempt fails, the invention will free a portion of the reserved memory to accommodate the allocation request (step 50). To obtain optimal usage of the global DOS memory, the global heap's control structures can be manipulated directly by the invention to facilitate the "best fit" of the allocation request. The global DOS allocation request is then reissued to complete the process (step 52). After such an action, the reserved memory is reduced in size with respect to the level selected by the user.

To attempt to restore the size of the reserved memory area, the GlobalDosFree function is also intercepted by the invention (step 54). The GlobalDosFree function is called by an application to relinquish previously allocated global DOS memory. If the reserved memory is already at its established size (step 56), as is usually the case, no action need be taken and the GlobalDosFree can be reissued. However, if the reserved memory has previously been diminished by an allocation, the invention utilizes the memory relinquished by GlobalDosFree to restore the size of the reserved memory area (step 58). Thus, system performance generally remains unimpaired.

Although the invention substantially improves the availability of global DOS memory, the possibility still exists that all such memory, including the reserved memory area, can be exhausted. If that occurs, applications may fail or refuse to run. The user, upon noting that condition, can then attempt to increase the size of the reserved memory area when Windows is next run.

It will be appreciated that embodiments of the invention may be employed in many different applications to improve the availability of a limited memory resource. While certain exemplary operations have been described herein, the appropriate scope hereof is deemed to be in accordance with the claims as set forth below.

What is claimed is:

1. A method for preserving the availability of a limited region of memory in a computer system for use by a process which requires access to memory within the limited range comprising the steps of:
   identifying a limited memory region for preservation, wherein the memory region is an unused part of memory;
   preserving at least a portion of the limited memory region by marking the portion of the limited memory region as used;
   detecting attempts to allocate from the limited range of memory;
   determining whether a sufficient amount of free memory is available within the limited range to satisfy a detected allocation attempt; and
   releasing, in response to a determination that a sufficient amount of free memory within the limited range of memory is not available, a sufficient amount of the preserved portion of memory to satisfy the allocation attempt.

2. The method of claim 1, wherein the marking step comprises allocating the quantity to a block.

3. The method of claim 1, further comprising the step of reissuing the attempt to allocate after the releasing step.

4. The method of claim 2, further comprising the steps of:
   monitoring memory release functions to intercept a call to release memory belonging to the region;
   upon intercepting such a call, determining the current size of the block; and
   allocating a portion of the memory released by the call to the block if the current size is smaller than the initial size.

5. A method for increasing the availability of a limited memory area of memory in a computer system for use by a process which requires access to memory within the limited range, comprising the steps of:
   identifying regions within a limited memory area that normally might remain unused; and
   allocating at least some of the identified unused regions to form a reserved memory block; and
   allowing virtual device drivers to claim memory from the limited memory area prior to the allocating step.

6. The method of claim 5 wherein the allocating step is performed by a virtual device driver loading later than other virtual device drivers.

7. The method of claim 6 wherein the allocating step is performed during the processing of the Init_Complete system broadcast.

8. The method of claim 5, further comprising the steps of:
   detecting attempts to allocate from the limited memory area;
   determining whether a sufficient amount of free memory is available within the limited range to satisfy a detected allocation attempt; and
   releasing, in response to a determination that a sufficient amount of free memory within the limited range is not available, a sufficient amount of the preserved portion of the reserved memory block to satisfy the allocation attempt.

9. The method of claim 8, wherein the monitoring step is performed by intercepting calls to the Microsoft Windows VMM service _Allocate_Global_V86_Data_Area.

10. A method for increasing the availability of a limited memory area, comprising the steps of:
    identifying regions within the limited memory area that normally might remain unused;
    allocating some or all of the regions to form a reserved memory block; and
    allowing virtual device drivers to claim memory from the limited memory area prior to the allocating step;
    wherein the limited memory area is the area between 640K and 1M on a PC-compatible computer.

11. The method of claim 10, wherein the regions are upper memory blocks.

12. The method of claim 5, further comprising the step of linking the reserved memory into the global heap.

13. A method for preserving the availability of a global DOS memory region under Microsoft Windows 3.1, comprising the steps of:
    identifying a portion of the global DOS memory region for preservation;
    marking a quantity of the identified region as used;
    detecting attempts to allocate from the region;
    upon a detection, analyzing one of actual or predicted results of the attempt to allocate; and
    releasing a portion of the quantity to satisfy the attempt to allocate if the analysis indicates that there is insufficient memory for the allocation.

14. The method of claim 13, wherein the marking step comprises allocating the quantity to a block.

15. The method of claim 13, further comprising the step of reissuing the attempt to allocate after the releasing step.

16. The method of claim 14, further comprising the steps of:

monitoring memory release functions to intercept a call to release memory belonging to the region;

upon intercepting such a call, determining the current size of the block; and allocating a portion of the memory released by the call to the block if the current size is smaller than the initial size.

17. A method for increasing the availability of global DOS memory under a Microsoft Windows operating system, which has upper memory available to virtual devices but not to Windows programs, comprising the steps of:

identifying areas within an upper memory region that normally might remain unused; and allocating some or all of the areas to form a reserved memory block.

18. The method of claim 17, further comprising the step of allowing virtual device drivers to claim memory from the upper memory region prior to the allocating step.

19. The method of claim 18 wherein the allocating step is performed by a virtual device driver loading later than other virtual device drivers.

20. The method of claim 18 wherein the allocating step is performed during the processing of the Init_Complete system broadcast.

21. The method of claim 18, further comprising the steps of:

detecting attempts to allocate memory from the reserved memory block;

determining whether a sufficient amount of free memory is available within the limited range to satisfy a detected allocation attempt; and releasing, in response to a determination that a sufficient amount of free memory within the limited range is not available, a sufficient portion of the reserved memory to satisfy the allocation attempt.

22. The method of claim 21, wherein the monitoring step is performed by intercepting calls to the Microsoft Windows VMM service _Allocate_Global_V86_Data_Area.

23. A method for increasing the availability of global DOS memory under a Microsoft Windows operating system, which has an upper memory region available to virtual devices but not to Windows programs, comprising the steps of:

identifying areas within the upper memory region that normally might remain unused; and allocating some or all of the areas to form a reserved memory block;

wherein the upper memory region is the area between 640K and 1M on a PC-compatible computer.

24. A method for increasing the availability of global DOS memory under a Microsoft Windows operating system, which has an upper memory region available to virtual devices but not to Windows programs, comprising the steps of:

identifying areas within the upper memory region that normally might remain unused;

allocating some or all of the areas to form a reserved memory block; and linking the reserved memory into the global heap.

25. The method of claim 24, wherein the linking step comprises the steps of:

creating new global heap arena headers for the linear addresses corresponding to the reserved memory; and walking the global heap arenas and linking the new arenas in sequence so as to maintain the increasing address order of the global heap.

26. The method of claim 16, wherein the functions include the GlobalDosFree function.

27. The method of claim 13, wherein the functions include the GlobalDosAlloc function.

28. The method of claim 1, wherein the identifying and marking steps are at least performed during a boot process, and all but a portion of the quantity marked during the boot process is released upon completion of the boot process.

29. The method of claim 17, wherein the functions include the _Alloc_Global_V86_Data_Area.

30. The method of claim 1, wherein said step of determining comprises the steps of:

intercepting the detected allocation attempt before it is processed; and predicting the results of the allocation attempt.

31. The method of claim 1, wherein the step of determining comprises the steps of:

allowing the detected allocation attempt to be processed; and determining whether the processed allocation attempt succeeded or failed.

32. The method of claim 31, further comprising the step of reissuing the attempt to allocate after the releasing step.

33. The method of claim 12, wherein the linking step comprises the steps of:

creating new global heap arena headers for the linear addresses corresponding to the reserved memory; and walking the global heap arenas and linking the new arenas in sequence so as to maintain the increasing address order of the global heap.

* * * * *